United States Patent [19]

Sakaguchi

[11] Patent Number: 5,767,989
[45] Date of Patent: Jun. 16, 1998

[54] IMAGE INPUTTING APPARATUS

[75] Inventor: Yasunobu Sakaguchi, Kanagawa, Japan

[73] Assignee: Fuji Photo Film Co., Ltd., Kanagawa, Japan

[21] Appl. No.: 720,871

[22] Filed: Oct. 3, 1996

[30] Foreign Application Priority Data

Oct. 5, 1995 [JP] Japan ................. 7-259043

[51] Int. Cl.$^6$ ..................... H04N 1/04; H04N 5/253; G01J 1/36; G01N 21/86
[52] U.S. Cl. ............ 358/474; 358/298; 358/486; 348/96; 348/97; 348/98; 250/201.3; 250/201.2; 250/204; 250/559.02
[58] Field of Search .................. 348/96, 97, 98, 348/345, 357; 358/298, 474, 486; 250/201.2, 201.3, 201.4, 208.1, 559.02, 204

[56] References Cited

U.S. PATENT DOCUMENTS

| | | | |
|---|---|---|---|
| 4,523,829 | 6/1985 | Eguchi et al. | 250/204 |
| 5,508,825 | 4/1996 | Kataoka | 358/474 |
| 5,568,270 | 10/1996 | Endo | 358/298 |

FOREIGN PATENT DOCUMENTS

| | | |
|---|---|---|
| 6-217091 | 8/1994 | Japan. |
| 6-233052 | 8/1994 | Japan. |
| 6-245062 | 9/1994 | Japan. |

Primary Examiner—Edward L. Coles
Assistant Examiner—Twyler M. Lamb
Attorney, Agent, or Firm—Birch, Stewart, Kolasch & Birch, LLP

[57] ABSTRACT

The improved image inputting apparatus for reading the image recorded on a transmission original comprises: a light source; an image sensor for photoelectrically reading the light that has issued from the light source and which has been transmitted through the original; an imaging lens for permitting the transmitted light to be focused on the image sensor; a focusing device for automatically adjusting a focus of the imaging lens; and a control device for controlling the focusing device before starting the reading of a new image group such that only the first frame of the image group is subjected to one-step automatic focusing or two-step automatic focusing consisting of coarse and fine adjustments whereas the other frames are not subjected to focusing but image reading is performed adopting the focus state of the first frame or are subjected to automatic focusing comprising only fine adjustment. The apparatus can allow projecting light that bears the image recorded on strips or slides to form a satisfactorily and accurately focused image on an image sensor such as CCD sensor, and also permit rapid and efficient image reading and thereby contribute to an improvement in the efficiency with which output images can be produced.

7 Claims, 8 Drawing Sheets

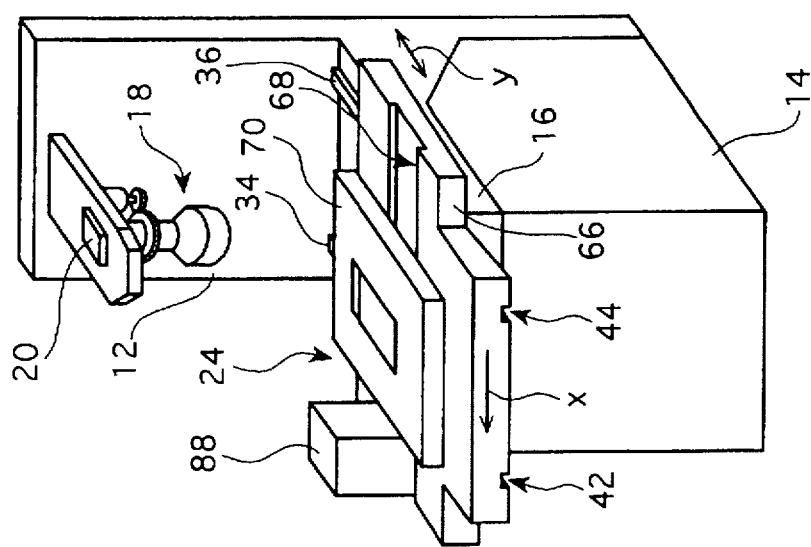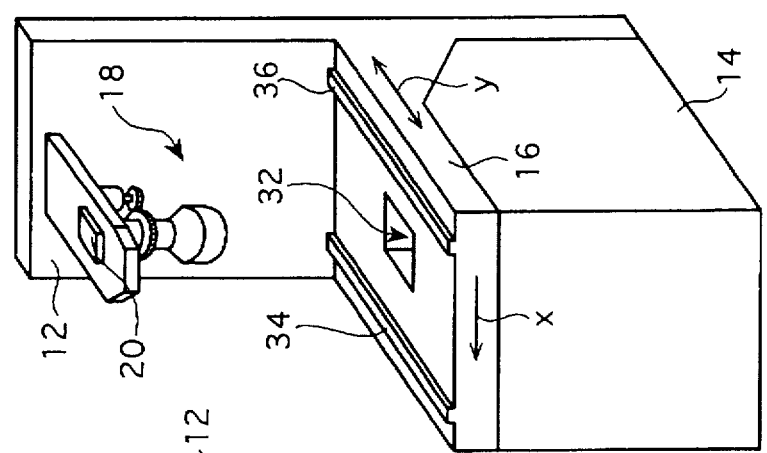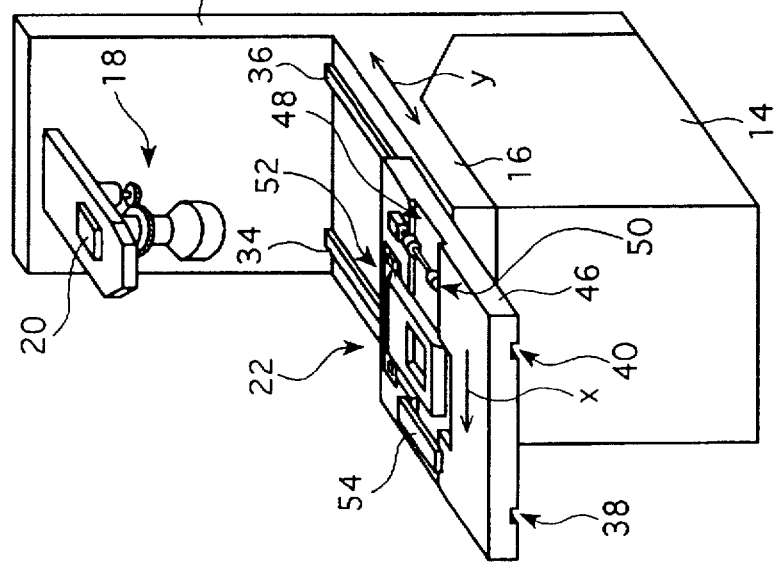

IMAGE INPUTTING APPARATUS

BACKGROUND OF THE INVENTION

This invention relates to the technical field of image inputting apparatus for use with photographic printers, other types of printers and reprographic machines that operate by photoelectric reading of the image recorded on transmission originals such as negative films and reversal films.

Images recorded on photographic film originals (hereunder referred to simply as "films") such as negative films and reversal films are conventionally printed onto photographic paper and other light-sensitive materials by "direct" exposure, or a method in which the recorded image is projected onto the light-sensitive material for a real exposure.

A recent model under development is printers that rely upon "digital" exposure. Called a "digital photoprinter", this apparatus produces projecting light which bears the image recorded on a film, reads the recorded image by photoelectric reading of the projecting light, converts the thus read image to digital signals, applies various steps of image processing to provide recording image information, records the image (latent image) by scan exposing the light-sensitive material with recording light modulated in accordance with the image information, and performs development and other processing to produce a print.

With digital photoprinters, it is easy to perform editing jobs such as synthesizing a plurality of images into a composite image or dividing a single image into segments, editing/layout combination of printed images such as editing characters in combination with images, and various procedures of image processing such as color/density adjustments, scaling and edge enhancement, and finished prints can be produced after desired editing and image processing has been made in accordance with a specific use. With prints produced by the conventional "direct" exposure, not all of the image density information recorded in films and the like can be reproduced in such aspects as density resolution, spatial resolution and color/density reproduction. In contrast, digital photoprinters are capable of outputting prints that feature almost complete reproduction of the image density information recorded on the films.

In addition, with digital photoprinters, the information about the image recorded in each film and the conditions for its image processing can be stored in the, internal memory or external storage media such as floppy disks and this offers the advantage that extra printing and other jobs can be accomplished without any films that serve as the original. What is more, extra printing and other jobs can be performed in a rapid and efficient manner without repeating the setting of specific process conditions.

The basic components of the digital photoprinter under consideration are an image inputting unit for reading the image recorded on the original such as a film, a setup unit that performs the necessary image processing on the thus read image to determine the exposing conditions for image recording, and an image recording unit that performs development after a light-sensitive material is scan exposed in accordance with the determined exposing conditions.

The assignee invented various image reading apparatus and methods for realizing such digital photoprinters and proposed them in Unexamined Published Japanese Patent Application Nos. 217091/1994, 233052/1994 and 245062/1994, together with the disclosure of an outline of the digital photoprinter.

The image inputting unit on such digital photoprinters is chiefly intended to accept originals that are generally referred to as "strips" or "sleeves" which are long (135 size or 240 size) negative or reversal films having a multiple of images (usually 24 or 36 frames) recorded thereon. Other often used originals are so-called "slides" which are single films (usually reversal films) that are individually held on mounts.

In the image inputting unit, a strips is transported intermittently such that the recorded images are sequentially sent to a specified image reading position or slides are sequentially transported such that images are sent to a specified image reading positions; then, the reading light issued from a light source is applied to the film so as to obtain projecting light that bears the recorded image and which is then projected onto an image sensor such as a CCD sensor in a sufficiently focused position to read the image photoelectrically. Hence, in order to achieve precise image reading and thereby produce an output image (print) of high quality, it is necessary that the projecting light be projected onto the image sensor in the correct focused position.

In fact, however, undeveloped films are roll films contained in film cassettes and even after development, the films are transported in a roll form. Therefore, the strips are usually curled and even if their periphery is depressed to become flat during image reading, the image plane (emulsion surface) will vary along the optical axis of the imaging lens and with an imaging lens of a single fixed focus, it is difficult to ensure that all images are focused on the image sensor with high precision.

Speaking of slides, their mounts often vary in thickness depending on their manufacturer and specifications. On the other hand, the axial position of slides in which they are retained (i.e., the surface on which they are supported) is usually constant, so the film position (the image plane) will vary greatly in the direction of optical axis, making it impossible for an imaging lens of a single fixed focus to ensure that all images are focused on the image sensor with high precision.

In order to eliminate these inconveniences, one may think of providing the input unit with an autofocusing capability so that focus adjustment is effected before each image is read, thereby ensuring that the projecting light will form the correct focused image at the imaging surface of the image sensor. However, focus adjustments are fairly time-consuming operations which considerably lower the efficiency of the image reading step and, in the case of digital photoprinters, the production rate of prints will be reduced.

It should particularly be noted that the thickness of slide mounts ranges widely from about 1.2 mm to 3.2 mm, so in order to ensure that automatic focus adjustment is satisfactorily performed on various slides, an effective focus position has to be searched through a very wide area but then considerable time is taken to perform the necessary focus adjustment.

SUMMARY OF THE INVENTION

The present invention has been accomplished under these circumstances and has as an object providing an image inputting apparatus with which projecting light that bears the image recorded on strips or slides can be allowed to form a satisfactorily focused image on an image sensor such as CCD sensor and which is also capable of permitting rapid and efficient image reading, thereby contributing to an improvement in the efficiency with which output images can be produced.

In order to attain the above-described objects, the first aspect of the present invention provides an image inputting apparatus for reading an image recorded on a transmission original, which comprises:

a light source for illuminating the transmission original with reading light;

an image sensor for photoelectrically reading the reading light that has issued from said light source and which has been transmitted through the transmission original;

an imaging lens for permitting said transmitted light to be focused on said image sensor;

focusing means for automatically adjusting a focus of said imaging lens; and control means for controlling said focusing means before starting the reading of a new image group such that only a first frame of said image group is subjected to automatic focusing whereas the other frames of the same image group are not subjected to focusing but image reading is performed adopting a focus state of said first frame.

Preferably, the image inputting apparatus described above further includes setting means for setting a frame or frames which, in addition to the first frame of the image group, are to be subjected to automatic focusing.

The second aspect of the present invention provides an image inputting apparatus for reading an image recorded on a transmission original, which comprises:

a light source for illuminating the transmission original with reading light;

an image sensor for photoelectrically reading the reading light that has issued from said light source and which has been transmitted through the transmission original;

an imaging lens for permitting said transmitted light to be focused on said image sensor;

focusing means for automatically adjusting a focus of said imaging lens; and control means for controlling said focusing means before starting the reading of a new image group such that only a first frame of said image group is subjected to automatic focusing consisting of coarse adjustment combined with fine adjustment whereas the other frames of the same image group are subjected to automatic focusing comprising only fine adjustment.

Preferably, the image inputting apparatus described above further includes setting means for setting a frame or frames which, in addition to the first frame of the image group, are subjected to automatic focusing consisting of coarse adjustment and fine adjustment and/or a frame or frames which are not subjected to automatic focusing.

The third aspect of the present invention provides an image inputting apparatus for reading an image recorded on a transmission original, which comprises:

a light source for illuminating the transmission original with reading light;

an image sensor for photoelectrically reading the reading light that has issued from said light source and which has been transmitted through the transmission original;

an imaging lens for permitting said transmitted light to be focused on said image sensor;

focusing means for automatically adjusting a focus of said imaging lens;

selection means for setting an automatic focusing mode independently for both a first frame of a new image group and the other frames of the same image group; and control means for controlling said focusing means such as to perform automatic focusing in the automatic focusing mode selected by said selection means.

Preferably, the image inputting apparatus described above further includes detection means for detecting a type of said transmission original and automatic focusing mode switching means for switching one automatic focusing mode to another for the frames other than the first of the image group in accordance with a result of detection by said detection means.

Preferably, the automatic focusing mode is either a mode for performing automatic focusing consisting of coarse adjustment combined with fine adjustment, or a mode for performing automatic focusing comprising only fine adjustment, or a review mode for checking an amount of fine adjustment and in which, if said amount exceeds a specified level, both coarse and fine adjustments are performed, or a mode in which, upon reading of a specified number of frames, either automatic focusing consisting of coarse adjustment combined with fine adjustment or automatic focusing comprising only fine adjustment is performed.

BRIEF DESCRIPTION OF THE DRAWINGS

FIGS. 3a, 3b and 3c are schematic perspective views showing the procedure of exchanging carriers on the image inputting apparatus shown in FIG. 1;

DESCRIPTION OF THE PREFERRED EMBODIMENTS

The image inputting apparatus of the invention will now be described in detail with particular reference to the preferred embodiments shown in the accompanying drawings.

Figure 1:
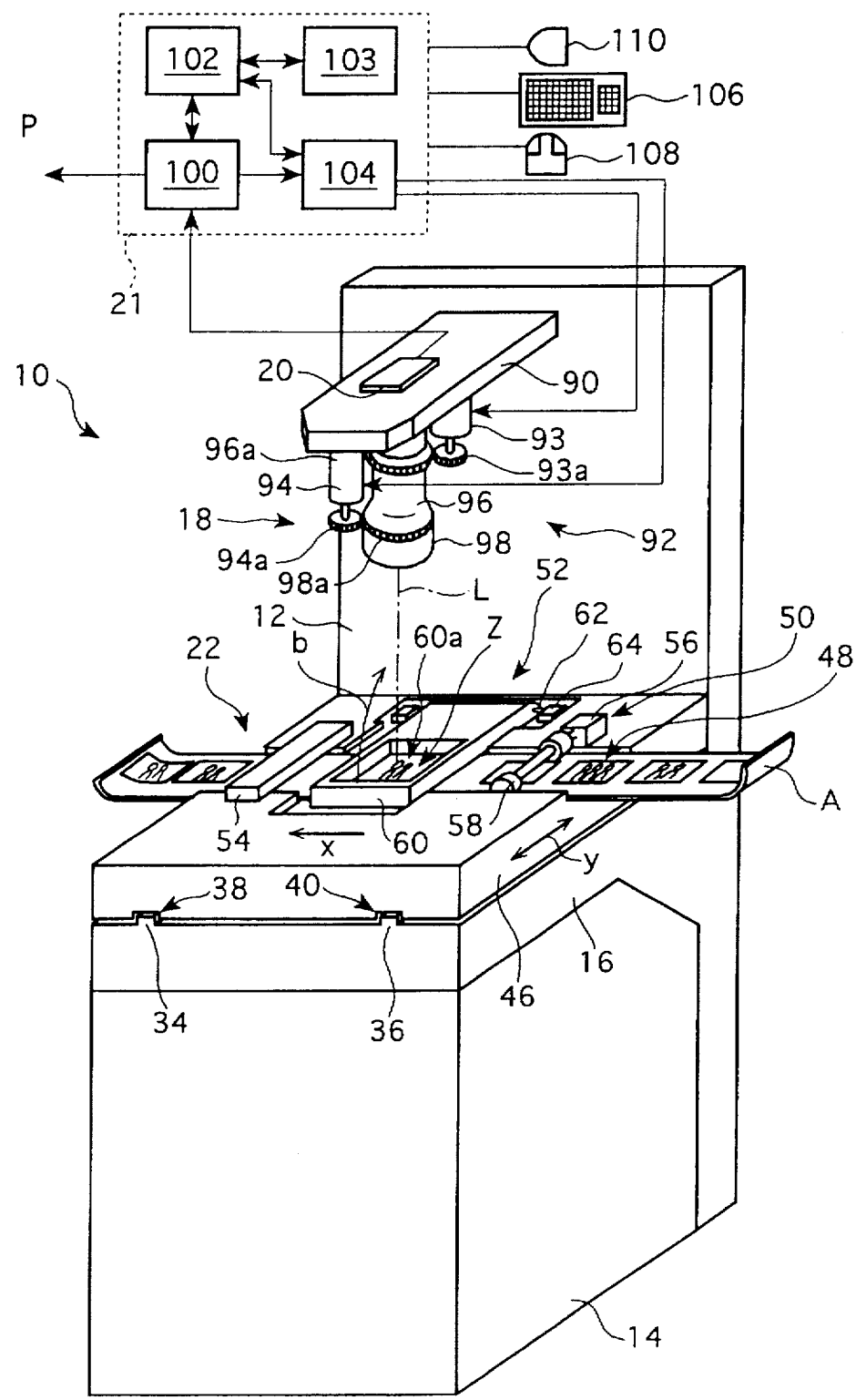
FIG. 1 is a schematic perspective view showing an example of the image inputting apparatus of the invention.

FIG. 1 is a schematic perspective view showing an example of the image inputting apparatus of the invention, * with control section 21 being presented in a block diagram. The image inputting apparatus (hereunder referred to simply as an "input apparatus") which is generally indicated by 10 is an input apparatus to be used on a digital photoprinter of the type described hereinabove and it reads photoelectrically the image recorded on the original which is either a strip (sleeve) A having a multiple of images (usually 24 or 36 frames) recorded on an elongated negative or reversal film or, alternatively, a slide B which is a single film (usually a reversal film) fixed on a mount. The basic components of the input apparatus 10 are an optical frame 12, a light source section 14, a carrier base 16, an imaging section 18, an image sensor 20 which is an area sensor, a control section 21, and a film carrier 22 or a slide carrier 24 (see FIGS. 3 and 4) that are detachably mounted on the carrier base 16.

The input apparatus 10 transports the strip A or slide B in the direction of arrow x by means of the film carrier 22 or slide carrier 24 that are mounted on the carrier base 16. The strip A or slide B then stops in a reading position Z, where it is illuminated with light from the light source section 14 to produce projecting light that bears the image on the film. The projecting light passes through the imaging section 18 such that it forms a focused image on the image sensor 20 which performs photoelectric conversion on the image; the output signal from the image sensor 20 is processed in the control section 21, whereby the image recorded on the film is read photoelectrically by areal exposure.

Figure 2:
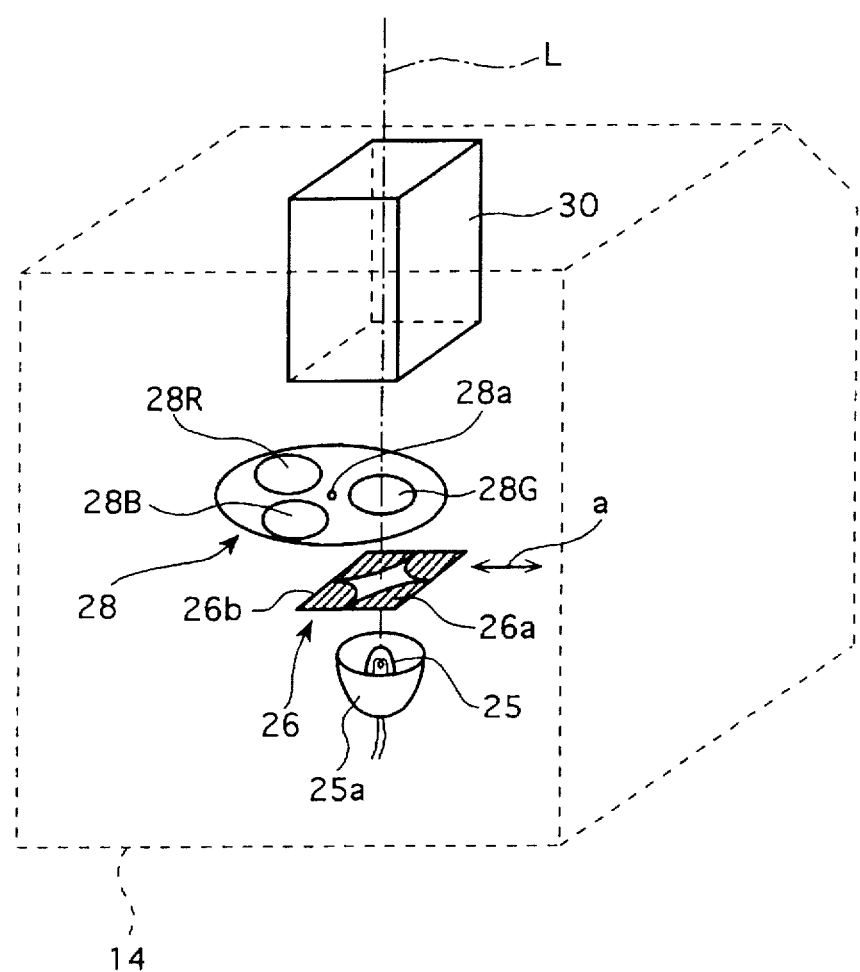
FIG. 2 is a schematic perspective view of the light source section in the image inputting apparatus shown in FIG. 1.

FIG. 2 is a schematic diagram of the light source section 14. Being a component of the input apparatus 10 shown in FIG. 1, the light source section 14 is for illuminating the strip A or slide B with light from below so as to create the projecting light. The light source section 14 having this capability is located under the carrier base 16 of the optical frame 12 and has a light source 25 with a reflector 25a, a diaphragm stop 26, a color filter plate 28, and a diffusion box 30. The light source section 14 additionally includes fans for cooling the light source 25 and various other members, as well as a shutter for blocking the light coming from the light source 25.

The light source 25 may be of any known type that is capable of issuing a sufficient quantity of light to perform image reading with the image sensor 20, as exemplified by a halogen lamp, a xenon lamp and a mercury lamp.

The diaphragm stop 26 is for adjusting the quantity of light from the light source 25. In the illustrated case, the diaphragm stop 26 is defined by two ND filters 26a and 26b each having a light shielding area drawn by logarithmic curves and which permit different quantities of light transmission in the directions of a two-headed arrow a perpendicular to the optical axis L. By bringing the ND filters 26a and 26b to come closer to or depart from each other in the directions of arrow a, one can adjust the quantity of light issuing from the light source 25 to reach the film.

The color filter plate 28 is a disk-shaped member having three color filters, R (red) filter 28R, G (green) filter 28G and B (blue) filter 28B, and which is adapted to be rotatable about the axis 28a by a rotating means (not shown). In an image reading mode, R filter 28R, G filter 28G and B filter 28B are sequentially inserted into the optical path L, whereby the image recorded on the film is separated into three primary colors R, G and B, for subsequent reading.

The reading light from the light source 25 that has its quantity adjusted by the diaphragm stop 26 and which has subsequently passed through the color filters is diffused in the diffusion box 30 such that the quantity and other features of the reading light incident on the film will be uniform over the film surface, or in the plane perpendicular to the optical axis L. In the illustrated case, the diffusion box 30 comprises a prism having internal specular surfaces with a diffusive plate fitted on both the top (e.g. a milky white polyacrylic plate) and bottom (e.g. ground glass). Other known means of diffusing light may of course be employed.

The carrier base 16 is disposed above the light source section 14 and provides a site for carrying the film carrier 22 or slide carrier 24 and holding them in a specified position. The carrier base 16 is secured perpendicular to the optical frame 12.

FIG. 3 illustrates a method of mounting the film carrier 22 or slide carrier 24 on the input apparatus shown in FIG. 1.

As shown in FIG. 3b, the carrier base 16 has an opening 32 formed in an area around the optical axis L to permit the passage of light from the light source 14. The size of the opening 32 depends on the maximum film size that can be read with the input apparatus 10 and it may be such that the light from the light source section 14 is capable of flooding the entire surface of a maximum size of images that are to be read with the input apparatus 10.

As shown in FIGS. 3a and 3b, the carrier base 16 has guide rails 34 and 36 formed on the top surface in a direction away from the operator toward the optical frame 12, namely, in the direction of arrow y which is perpendicular to the transport direction indicated by arrow x.

As FIG. 3b also shows, grooves 38 and 40 are formed in the bottom surface of the film carrier 22 in positions that correspond to the guide rails 34 and 36. As FIG. 3c shows, grooves 42 and 44 are formed in the bottom surface of the slider carrier 24 in positions that correspond to the guide rails 34 and 36. Thus, the film carrier 22 or the slide carrier 24 which are placed on top of the carrier base 16 have their positions restricted in the direction of arrow x by the combinations of the guide rails 34 and 36 with the corresponding grooves. When the end face of the film carrier 22 or slide carrier 24 which is remote from the operator contacts the optical frame 12, the carrier will not move any further in the direction of arrow y. Thus, the film carrier 22 or slide carrier 24 which are placed on top of the carrier base have their position determined specifically in both directions of arrows x and y.

The input apparatus 10 is preferably fitted with detection means 120 (see FIG. 6) for detecting the type of the carrier mounted on the carrier base 16. The control section 21 preferably identifies the type of original in accordance with the detected type of carrier; if the carrier base 16 has the carrier 22 mounted thereon, the transmission original is identified as strip A and if the carrier base 16 has the slide carrier 24 mounted thereon, the original is identified as slide B.

The method of detecting the type of carrier is not particularly limited and may be exemplified by the following: i) when the carrier mounted on the carrier base 16 is electrically connected to the input apparatus 10, a signal indicating the type of the carrier is issued or the state of coupling with the connector or the like is used as an indicator; ii) the carrier base 16 and the carrier are provided with a microswitch and a mating projection or the like respectively and the type of the carrier is detected in accordance with the state of activation of the microswitch; and iii) the operator manually enters the type of the carrier.

The method of identifying the type of transmission original is in no way limited to the case of detecting the type of carrier and other methods may be employed such as manual entry by the operator and the identification of film type on the basis of the result of rough image reading (generally speaking, strip A is a negative film and slide B is a reversal film).

The film carrier 22 transports the strip A intermittently in a longitudinal direction such that the recorded images (frames) are sequentially transported to a specified position on the optical axis L, namely, the reading position Z corresponding to the opening 32 in the carrier base 16, for subsequent reading.

As already mentioned, the bottom surface of the main body 46 of the film carrier 22 is provided with the groove 38 corresponding to the guide rail 34 on the carrier base 16, as well as the groove 40 corresponding to the guide rail 36 also formed on the carrier base 16.

The top surface of the main body 46 is provided with a guide groove 48 in an area intercepting the optical axis L which extends across the main body 46 in the transport direction indicated by arrow x. The guide groove 48 has substantially the same width as the strip A, which is fitted into the groove 48 and transported in a longitudinal direction which agrees with the direction x such that the individual frames are sequentially transported to the reading position Z on the optical axis L. To this end, the depth of the guide groove 48 is adjusted such that the image plane (i.e., the emulsion surface) of the strip A is in a specified position along the optical axis L (in the direction of focal depth).

An opening for admitting the passage of the reading light from the light source section 14 is formed in the reading position Z in the main body 46 of the film carrier 22. This opening also serves as a mask for restricting the light entering the images on the strip A, so if the strip is of 135 size, the opening should have the corresponding size and shape. Needless to say, the reading position Z is such that when the film carrier 22 is placed in a specified position on the carrier base 16, the position Z is in registry with the specified position on the optical axis L, namely, the opening 32 in the carrier base 16.

Alternatively, the opening to be formed in the main body 46 of the film carrier 22 may have a size corresponding to the opening 32 in the carrier base 16 such that a plurality of masks associated with various film sizes are interchangeably fitted on the film carrier 22.

The guide groove 48 is fitted with a strip transport means 50, a film compressing unit 52 and an image plane detecting sensor 54 which are arranged in that order in the transport direction x.

The transport means 50 consists of a motor 56 and transport rollers 58 and transports the strip A in the direction of arrow x such that when the result of detection with the image plane detecting sensor 54 shows that the next frame has come to the reading position Z, the transport means 50 stops transporting the strip A and, upon receiving a READ END signal from the control section 21, the transport means 50 resumes the transport of the strip A until the subsequent frame is transported to the reading position Z.

The film compressing unit 52 compresses the strip A onto the bottom of the guide groove 48 in the reading position Z in an image reading mode such that a curl and other habits of the strip A are eliminated to insure that the entire image surface is held in a specified position along the optical axis L. The film compressing unit 52 having this capability is composed of a compressing member 60 and a pivoting means 64 that causes the compressing member 60 to pivot on the shaft 62 in the direction of arrow b. When the strip A is being transported, the compressing member 60 is in an UP position as the result of movement by the pivoting means 64 and in the reading mode, the compressing member 60 is in a DOWN position to depress the strip A in the reading position Z. An opening 60a that admits the passage of projecting light bearing the image of the strip A is formed in the compressing member 60 in an area corresponding to the reading position Z.

It should, however, be noted that even if the perimeter of an individual image is depressed by means of the film compressing unit 52, not all of the curls in the strip can be removed but the image plane will vary in the direction of optical axis L. To deal with this problem, the input apparatus 10 performs automatic focus adjustments and thereby ensures that the projecting light will form the correct focused image on the image-receiving plane of the image sensor. Further details of this point will be given later in the specification.

The image plane detecting sensor 54 is a known optical sensor which detects not only the image recorded in strip A upstream of the reading position Z in the direction X but also the DX code, thereby specifying the position of a particular frame at the reading position Z. In the illustrated film carrier 22, the result of detection with the image plane detecting sensor 54 is relied upon to control the transport of the strip A by the transport means such that the individual frames are sequentially stopped in the reading position Z, with the strip A being brought into engagement or disengagement with the film compressing unit 52.

If desired, prior to the reading of the images recorded on the strip A, the latter may be transported by the transport means 52 and read with the image plane detecting sensor 54 so as to count the number of recorded images (frames), check whether the film is of the usual size or a panoramic size and obtain other pieces of information, which are collectively sent to the control section 21.

The slide carrier 24 transports the slide B (i.e. a film with a recorded image which is held on a mount) in the direction of arrow x and stops it at the reading position Z, where it is subjected to image reading. A plurality of slides B on which the reading operation has completed are collected.

Figure 4:
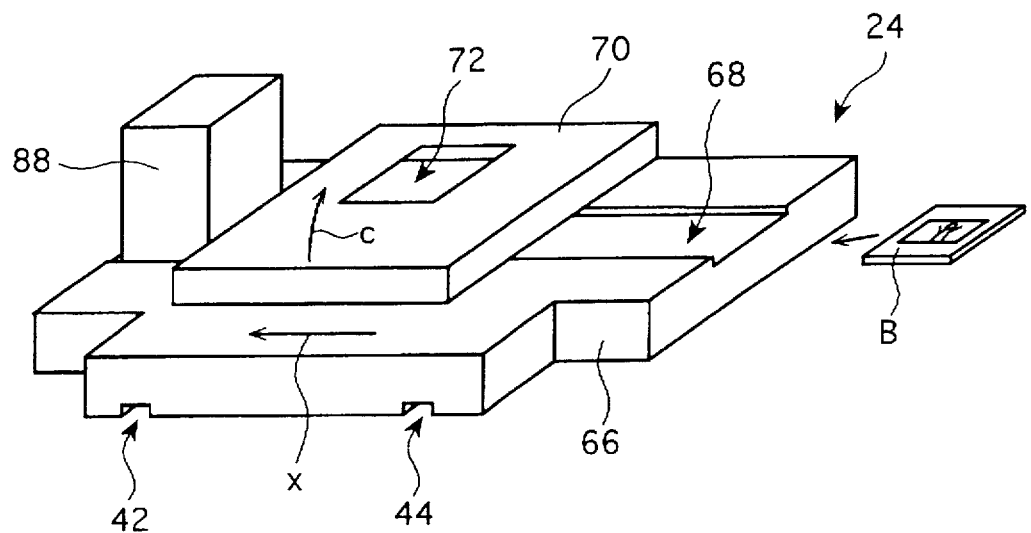
FIG. 4 is a perspective schematic view of the slide carrier that may be mounted on the image inputting apparatus shown in FIG. 1.

FIG. 4 is a schematic perspective view of the slide carrier 24. As in the case of the film carrier 22, grooves 42 and 44 corresponding to the guide rails 34 and 36 on the carrier base 16 are formed in the bottom surface of the main body 66 of the slide carrier 24. The slide carrier 24 is similarly mounted on the carrier base 16 such that the farthest end which is remote from the operator will contact the optical frame 12.

The top surface of the main body 66 is provided with a guide groove (transport stage) 68 for guiding (positioning and transporting) the slide B; the guide groove 68 is in a plane perpendicular to the optical axis L and extends across the main body 66 in the slide transport direction indicated by arrow x. The depth of the guide groove 68 is so set that when slide B that is either standard or which is of a type that is most frequently subjected to image reading is placed in that guide groove, the image plane (i.e., the emulsion surface) of the slide B is substantially in a specified position along the optical axis L (in the direction of focal depth). It should, however, be noted that since the thickness of the mount of slide B varies with the manufacturer and specifications, the image plane is variable in the direction of the optical axis L. To deal with this problem, the input apparatus 10 performs automatic focus adjustments and thereby ensures that the projecting light will form the correct focused image on the image-receiving plane of the image sensor. Details of this point will also be given later in the specification.

The main body 66 of the slide carrier 24 is also provided with an opening that is formed in the reading position Z and which admits the light from the light source section 14. The opening also serves as a mask. As in the case of the film carrier 22, masks as separate entities from the main body 66 may be used interchangeably in accordance with the size of slide B.

A cover 70 is disposed on top of the main body 66 in an area surrounding the reading position Z. The cover 70 is an enclosure that has a hole 72 formed in the top surface to permit the passage of the projecting light bearing the image recorded on the slide B and which is open at the bottom. In the normal reading mode, the reading position Z is covered but, if necessary, the cover 70 can be opened by pivoting in the direction of arrow c about the lower edge of the farthest side remote from the operator, whereby the reading position Z becomes exposed.

Figure 5:
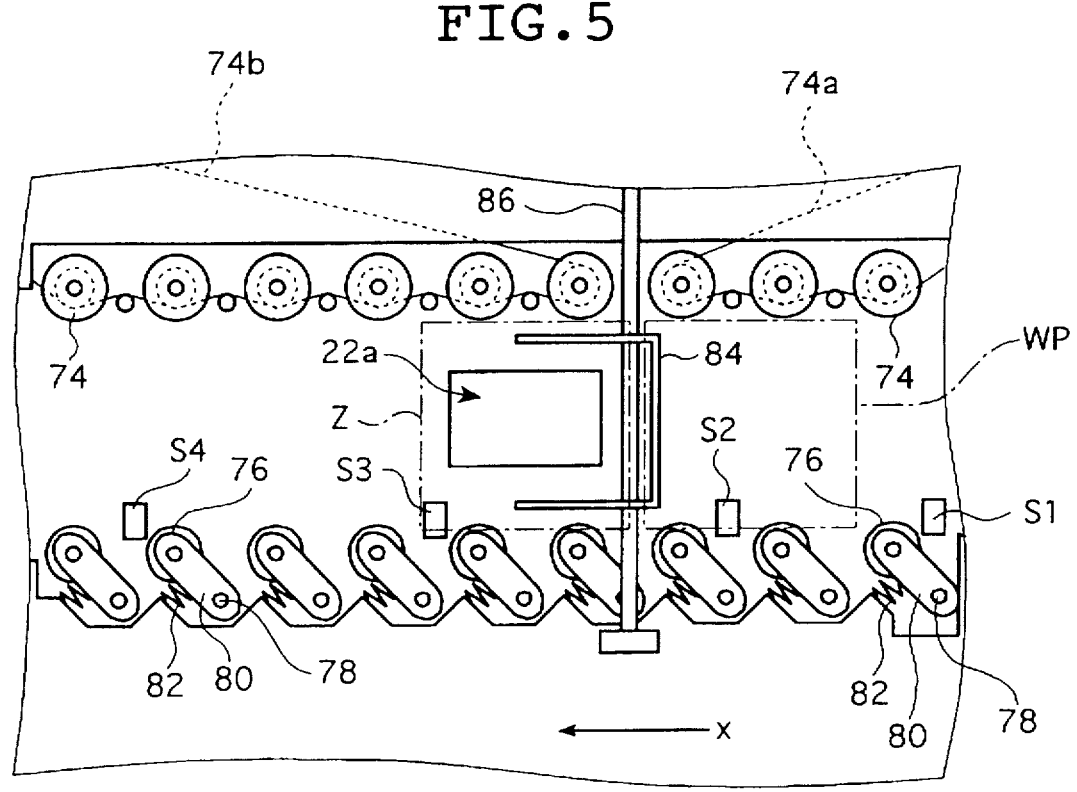
FIG. 5 is a schematic plan view showing the area around the reading position in the slide carrier shown in FIG. 4.

FIG. 5 is a schematic plan view of the area around the reading position Z with the cover 70 opened. As shown, the exposed (uncovered) area of the slide carrier 24 is provided with four sensors, sensor S1 for detecting the supply of slide B with the operator, sensor S2 for detecting standby slide B which is in a waiting position WP for the next reading operation, sensor S3 for detecting slide B in the reading position Z, and sensor S4 for confirming that slide B has been discharged into a slide recovery box 88 (see FIG. 4).

Nine rollers for transporting the slide B are provided on either side of the guide groove 68 in a direction parallel to the direction of arrow x, with adjacent rollers being spaced by a distance corresponding to the size of slide B. The rollers in the upper part of FIG. 5 are driving rollers 74 for transporting the slide B and consist of two groups, the first drive group consisting of three rollers 74 that are driven by an endless belt 74a connected to a drive source (not shown) and by means of which the slide B supplied by the operator are transported to either the waiting position WP or a point just before the reading position Z, and the second drive group consisting of six rollers 74 that are driven by an endless belt 74b connected to another drive source (not shown) and which receives the slide B from the first drive group, transports it to the reading position Z, rejects it from the reading position Z when the reading operation ends, and transports it to the slide recovery box 88. On the other hand, the rollers in the lower part of FIG. 5 are driven rollers 76, each of which is rotatably supported at an end of an arm 80 which is pivotally mounted on a fulcrum 78. The arms 80 are urged toward the driving rollers 74 by means of springs 82. Therefore, the slide B is positively transported as it is pressed against the driving rollers 74 by means of the driven rollers 76; at the same time, the difference in size between successive slides B is effectively absorbed by the pivoting action of the arms 80 which support the driven rollers 76.

A slide holder 84 may optionally be provided in the reading position Z. The slider holder 84 is adapted to be capable of pivoting as a result of the rotation of a shaft 86 by a drive source (not shown) so that in a reading mode, the farther end of the holder 84 (which is opposite the side where the shaft 86 is provided) depresses the slide B against the bottom of the guide groove 68 and thereby eliminates any deformations and other defects of the slide B (particularly its mount).

The slide recovery box 88 is provided downstream of the cover 70 in the direction of arrow x for collecting slides B for which the reading operation has ended. In the slide recovery box 88, slides B are accommodated in such a way that each slide is slid under the already recovered slide by suitable means such as guide rollers projecting slightly above the bottom of the guide groove 68; thus, after the reading operation, the slides B are recovered by being stacked with the last coming slide being slid under the previous one. The slide recovery box 88 is not limited to the type just described above and it may be adapted in such a way that each slide is pushed by the following slide to drop into the box.

The reading operation with the slide carrier 24 will proceed as follows. The operator first places the slide B in the guide groove 68 and feeds it manually to the position of sensor S1 as it is guided by the side walls of the groove 68. When sensor S1 detects the slide B, all the driving rollers 74 or those of the first drive group will start to rotate and transport the slide B either to the reading position Z (if it is not detected with sensor S2) or to the waiting position WP (if the slide is detected with sensor S2), where the rotation of the rollers 74 stops.

When image reading is effected in the reading position Z and if a signal indicating the end of image reading is received from the control section 21, the transport rollers 74 start to rotate again causing the slide B to be accommodated in the recovery box 88.

In addition to the film carrier 22 for transporting the strip A and the slide carrier 24 for transporting the slide B, the input apparatus 10 may use various kinds of carriers that can be freely mounted in specified positions on the carrier base. Examples of such optional carriers include a manual carrier with which the operator fixes a strip or slide in the reading position Z or a trimming carrier with which the operator places the film or slide in a desired reading position Z for subsequent image reading.

Turning back to FIG. 1, the imaging section 18 is disposed in the upper part of the optical frame 12. Having a lens unit 92 suspended from a platform 90 fixed to the optical frame 12, a zooming motor 93, and a focusing motor 94, the imaging section 18 ensures that the projecting light bearing the image of the strip A or slide B will form a focused image on the image sensor 20.

The lens unit 92 is composed of a zoom lens portion 96 and a focusing lens portion 98 positioned upward (downstream in the direction of the optical axis L). The zoom lens portion 96 incorporates a known zoom lens that changes the magnification according to the size of strip A or slide B and which adjusts the projecting light to a maximum size that can be received by the image sensor 20 (i.e., the size at which the longest side of the required image region is inscribed by the light-receiving plane of the image sensor 20) to either form a focused image on the image sensor 20 or make enlargement according to the data entry (trimming) by the operator. The focusing lens portion 98 incorporates a known focusing lens for adjusting the projecting light to focus on the image-receiving plane of the image sensor 20. The focusing lens portion 98 has an adjustable gear 98a that meshes with a gear 94a that is rotatably driven by the focusing motor 94; thus, the focusing lens portion 98 is actuated by the focusing motor 94 to perform focus adjustment. The zoom lens portion 96 has an adjustable gear 96a that meshes with a gear 93a that is rotatably driven by the zooming motor 93; thus, the zoom lens portion 96 is actuated by the zooming motor 93 for magnification adjustment.

The drive of the zooming motor 93 and the focusing motor 94 is controlled by the focusing means 104 in the control section 21 and the illustrated input apparatus 10 performs automatic focusing by a TTL (through-the-lens) method using the contrast of the individual images obtained by reading with the image sensor 20. The method of focus adjustment is by no means limited to the TTL method and various other known techniques can be employed, such as a photoelectric method and a method relying upon the distance between the film surface and the image sensor 20 as measured by triangulation.

The projecting light bearing the image of strip A or slide B is processed by the lens unit 92 to form a focused image on the image sensor 20, which is then read photoelectrically. Provided between the lens unit 92 and the image sensor 20 is a known shutter the principal function of which is to perform dark current correction.

In the input apparatus 10 which performs image reading by areal exposure, the image sensor 20 is an area sensor exemplified by a CCD sensor of 1380×920 pixels. In the illustrated apparatus, the image sensor 20 is adapted to be movable in both x- and y-directions by an amount corresponding to half a pixel and this increases the apparent number of reading pixels by a factor of up to four.

Signals from the image sensor 20 are sent to the control section 21. The control section 21 has an image processing unit 100, a CPU 102, a memory 103 and a focusing unit 104. The image processing unit 100 receives output signals from the image sensor 20, performs specified image processing and outputs the resulting image information. The CPU 102 controls the parts of the input apparatus 10 (or digital photoprinter) both individually and as a whole. The memory 103 stores various data such as positional references and search areas for automatic focusing that have been set in accordance with relevant factors such as the type of transmission original (whether it is strip A or slide B) and the reading magnification and the data for temperature compensation of the positional references. The positional references for automatic focusing mean the amount of movement of the zoom lens portion 96 from its home position (HP) to the reference position (i.e., the number of reference pulses to be applied to the zooming motor 93) and the amount of movement of the focusing lens portion 98 from its HP at the reference position of the zoom lens portion 96 to the reference focus position (i.e., the number of reference pulses to be applied to the focusing motor 94). The focusing unit 104 performs automatic focusing using the images obtained by reading with the image sensor 20.

The control section 21 is also connected to a display 110, a keyboard 106 and a mouse 108. The display 110 shows the images read with the image sensor 20, as well as instructions for performing operations such as providing print size and color/density settings. The keyboard 106 and the mouse 108 are manipulated by the operator to run the input apparatus 10 typically for entering various kinds of settings associated with image reading (outputting) such as the settings of print size and the principal recorded object.

Figure 6:
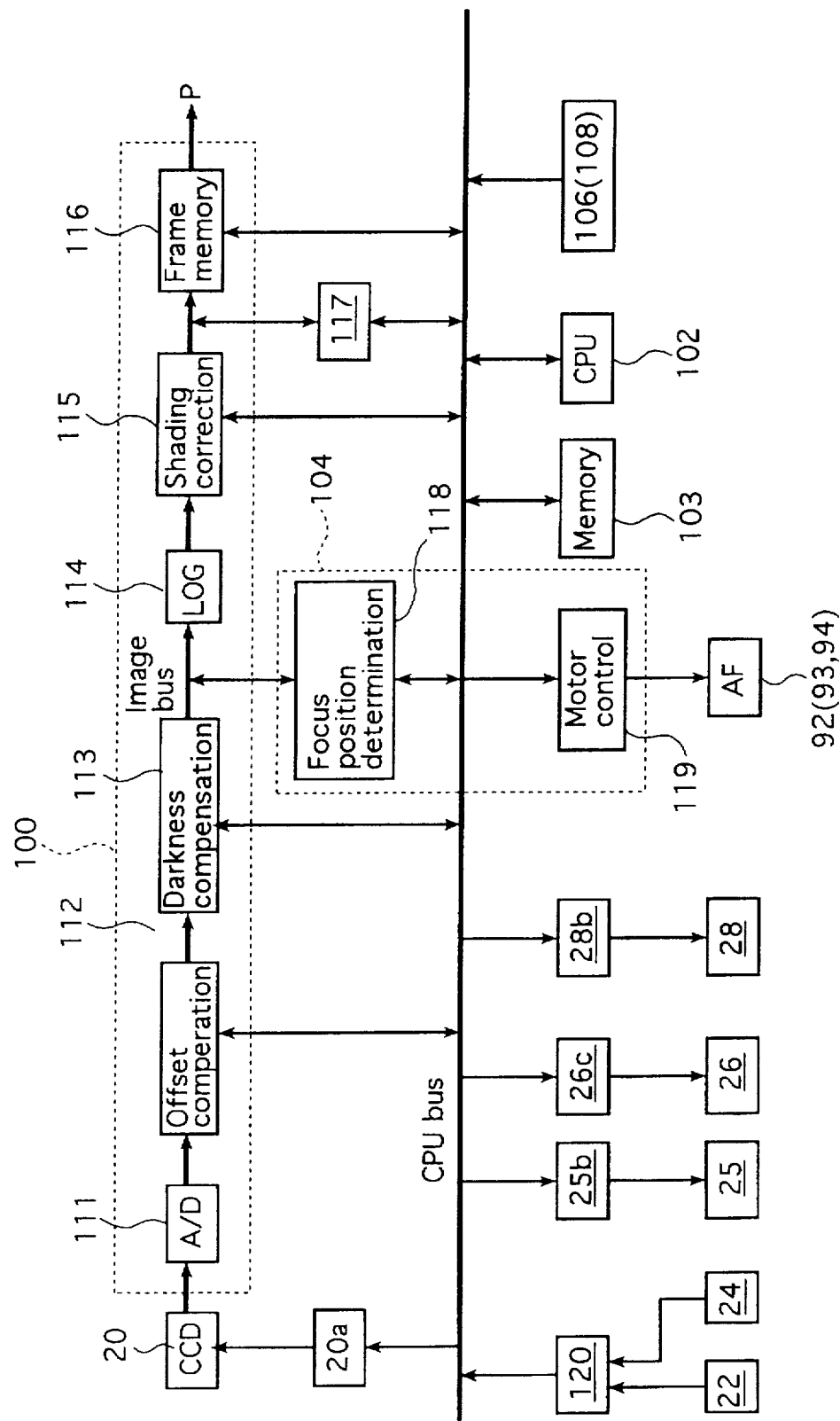
FIG. 6 is a block diagram for an example of the control section of the image inputting apparatus shown in FIG. 1.

FIG. 6 is a block diagram showing details of an example of the control section 21. As shown, the image sensor 20 which is typically a CCD is connected to a CPU bus via a circuit 20a which controls the movement of the CCD 20 in both x- and y-directions so as to increase the apparent number of reading pixels. The image information read by the CCD 20 is fed into the image processing unit 100, in which the analog image data read by the CCD 20 is converted to digital image data in an A/D converter 111, corrected for any DC offset in an offset compensation circuit 112 and then subjected to darkness compensation in a darkness compensation circuit 113. Thereafter, the digital image data is transformed logarithmically in a LOG transformer circuit 114 and shading corrected in a shading compensation circuit 115. The resulting data is stored in a frame memory 116 and delivered to an external (output) device P such as an image recording unit (not shown).

After the darkness correction in the darkness compensation circuit 113, the image data is fed into the automatic focusing means 104, where the image contrast values at various points within a specified search area are integrated in a focus position determining circuit 118 (for details, see below) and the position where the integration assumes a maximum value is designated the "focus position". The information on this focus position obtained in the focus position determining circuit 118 is transmitted via the CPU bus to a motor drive control circuit 119 which controls the motors 93 and 94 in the lens unit 92.

Carrier type identifying means 120 sends out information as to which of the film (or strip) carrier 22 or the slide carrier 24 is loaded. This information, as well as the information about reading conditions such as the reading magnification that are entered by manipulation of the keyboard 106 and the mouse 108 are fed via the CPU bus into the CPU 102, memory 103, and the focus position determining circuit 118 and motor drive control circuit 119 in the automatic focusing means 104.

The light source section 14 has the light source 25, the diaphragm (iris diaphragm) 26 and the color filter plate 28 and these components are controlled for light intensity, the degree of diaphragm opening and the type of color filter by respective means of a light source control circuit 25b, a diaphragm control circuit 26c and a color filter control circuit 28b that are connected to the CPU 102 via the CPU bus.

The control section 21 may include a positive/negative converter circuit 117 in which the image information that has been subjected to the specified image processing in the image processing unit 100 undergoes reversal to either positive or negative image. If the strip A or slide B is a reversal film, the image information that has been subjected to the specified image processing is delivered to the output device P after it undergoes conversion to a negative (or positive) image in the positive/negative converter circuit 117. There are no particular limitations on the method of effecting positive-to-negative or negative-to-positive conversion and any known methods of conversion (image processing) may be employed.

The image processing unit 100 also sets the conditions for the image processing described above. As is well known, the reading operation for producing output image from various input apparatus (which operation is commonly called "main scanning") is usually preceded by prescanning in which the original image is roughly read for various purposes such as setting the conditions of image processing. On the basis of the image information obtained by prescanning, the principal recorded object which may optionally be set, and the entered processing conditions, the image processing unit 100 sets the conditions of performing image processing on the image information for the main scanning and performs the various kinds of image processing already mentioned above.

The image processing unit 100 is connected to the focusing means 104, which performs automatic focusing by adjusting the focusing lens portion 98 on the basis of the image read by the image sensor 20. In accordance with the contrast of the thus read image, focusing is performed; in other words, the focusing lens portion 98 is adjusted by means of the focusing motor 94.

Figure 7:
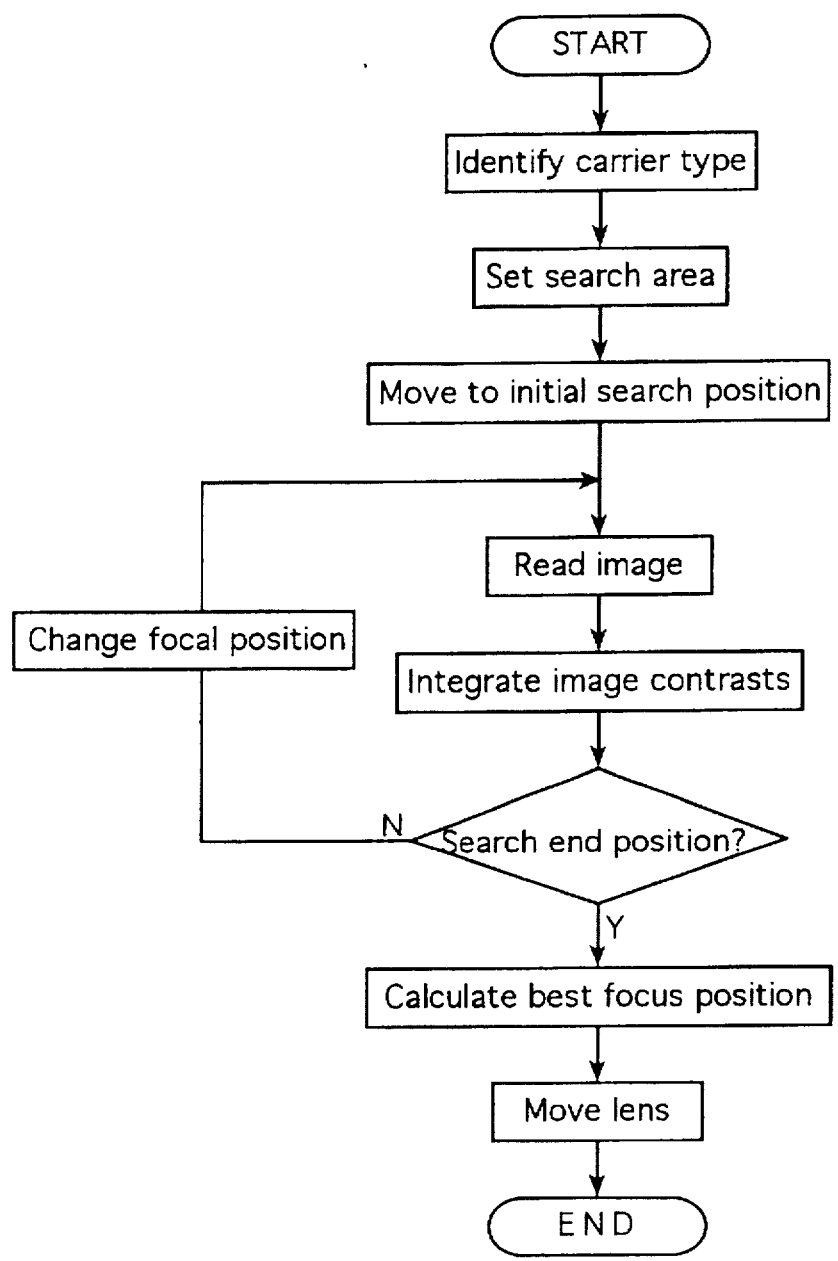
FIG. 7 is a flowchart for illustrating the process sequence of automatic focus adjustment to be performed by the image inputting apparatus shown in FIG. 1 in accordance with the first embodiment of the invention.

FIG. 7 is a flowchart for the first embodiment of focus adjustment by the focusing means 104 in the input apparatus 10.

Under the control by the motor drive control circuit 119, the automatic focusing means 104 first reads the number of pulses from the memory 103 which represents the amount of movement of the zoom lens portion 96 that is required by a specified reading magnification. The pulse motor 93 is supplied with the thus read number of pulses and moves the zoom lens portion 96 to the position specified by the reading magnification. This position is for zooming in such a manner that the image areas that need be read from the film original (strip A or slide B), or the specified area setting, can be focused within substantially the whole region of the total sensor area of the CCD 20 (to be more exact, within a region a little smaller than the total sensor area). It should be noted here that the prints of film originals such as strips A or slides a typified by negative or reversal films do not usually reproduce the entire part of the image that is recorded (borne) on the film original but the size of an image to be reproduced in a print is strictly set to the predetermined size with respect to the size of the image borne on the film original. This is why the input apparatus 10 employs the lens unit 92 having a zooming capability in order to ensure that the size of the image on the film original to be reproduced is brought into complete agreement with the required size setting as compared to the total area of the CCD 20.

In the next step, the automatic focusing means 104 evaluates the result of identification of the carrier mounted on the carrier base 16, preferably together with the result of temperature measurement, so as to determine whether the film original to be read with the image sensor 20 is strip A or slide B. Depending upon the result of this determination, the automatic focusing means 104 calculates a predicted focus position (a position where best focus is expected to be achievable) and sets a "search area" around this position (or an area through which a search is conducted to find the best focus position). The "search area" may typically be a specified range of focal length including the ordinary focal length in the center and this is predetermined by the type of the film original to be reproduced (or carrier). It should be noted here that the type of the carrier mounted on the carrier base 16 may be identified automatically by the CPU 102 or the automatic focusing means 104 in response to the mounting of the carrier on the base or, alternatively, the operator may manually enter the type of the carrier by manipulation of the keyboard 106 or the mouse 108.

In parallel with the setting of the search area by the above-described method in accordance with the present invention, G filter 28G of the color filter plate 28 is inserted into the optical path L by means of the control circuit 28b in the light source section 14.

After the search area is set, the motor control circuit 119 in the automatic focusing means 104 applies specified pulses to drive the focusing motor 94 so that the focusing lens portion 98 is moved to a SEARCH START initial position, typically, the position where the focal length is the shortest within the search area. Subsequently, the projecting light that has been issued from the light source 25, adjusted in quantity by passage through the G filter 28G and which bears the G image (or the image that has passed through the film original) is read with the image sensor 20, such that the image on the film (i.e., G image) is read.

The output signals from the image sensor 20 are sent to the image processing unit 100, where they are subjected to various steps of imaging processing such as A/D conversion, offset correction and darkness correction and then sent to the automatic focusing adjusting means 104 as image information. Thereafter, on the basis of the thus obtained image information, the focus position determining circuit 118 in the automatic focusing means 104 integrates the values of image contrast, namely, calculates the integral values of MTF (modulation transfer function) for the image readout in a specified spatial frequency range.

These procedures of image reading and integration of image contrast values are repeated in respective positions with the focusing lens portion 98 being moved by specified amounts (to increase the focal length in the case under discussion) from the initial position of the search area to its end point (i.e., until the focal length attains a maximum value within the search area) by driving the focusing motor 94 with the motor control circuit 119 in the automatic focusing means 104. The movement of the focusing lens portion 98 may be continuous or intermittent.

When the integration of image contrast values over the search area ends, the focus position determining circuit 118 in the focusing means 104 detects the position where the highest integral value of image contrast is obtained and designates it as a focus position. Then, the motor control circuit 119 drives the focusing motor 94 to set the focusing lens portion 18 in the focus position so that the focal point of the projecting light is correctly in registry with the image-receiving plane of the image sensor 20.

The above-described method is not the sole technique of performing automatic focusing in the input apparatus 10 of the present invention and various other known techniques can be employed, such as a photoelectric method and a method relying upon the distance between the film surface and the image sensor 20 as measured by triangulation.

The input apparatus 10 of the invention is capable of reading the images on both strip A and slide B which are originals of entirely different shapes. As already mentioned in connection with the description of the prior art, strip A is in most cases handled in a roll form irrespective of whether it has or has not been developed. Therefore, strip A is usually curled and even if its perimeter is depressed by the compressing member to become flat during image reading, the curl cannot be completely eliminated and the image plane will not be uniform in the direction of the optical axis L. Slide B which has a mount is thicker than strip A and the thickness of the mount often varies (typically ranging from about 1.2 mm to 3.2 mm) with the manufacturer and specifications, which also causes unevenness in the image plane along the optical axis L.

The input apparatus 10 of the invention has the above-described automatic focusing capability, so it ensures consistent and highly precise image reading in spite of variations in the image plane along the optical axis L. In the illustrated case, image sensor 20 performs image reading (specifically the reading of G image) at the respective focal lengths that are adjusted by the focusing lens portion 98 by the TTL method within a specified search area and, on the basis of the contrasts of the respective images read by the image sensor 20, the focusing means 104 determines the required amount of focus adjustment designating the focal length of the highest image contrast as the best focus position, and drives the focusing motor 94 to adjust the focusing lens portion 98 so that the projecting light will be correctly focused at the image-receiving plane of the image sensor 20.

In the first embodiment of the invention, the focusing means 104 and the associated mechanism in the input apparatus 10 performs automatic focusing solely on the first image (frame) of an image group and the other frames are not subjected to any particular focus adjustment but their image reading is performed adopting the focus state of the first frame. In other words, a "default" is programmed in the CPU 102 such that only the first frame is subjected to automatic focusing.

Stated specifically, if the original is strip A, only the frame that is to be first read among the frames of a single strip A is subjected to automatic focusing and the remaining frames are subjected to image reading on the basis of the thus adjusted focal condition. If the original is slide B, the most frequently encountered case is that a request is made to perform simultaneous image reading on (or prepare prints simultaneously from) a group of images (slides), such as where a certain customer has requested collective image reading of one slide group. In a case like this, the slide (frame) to be read first is subjected to automatic focusing and the remaining slides (frames) are subjected to image reading on the thus obtained focal condition.

According to the studies conducted by the present inventors, the state and habit of the curl in a single strip A are substantially the same in all of its frames. The present inventors have also found that all of the slides B sent from one customer at a time are usually the products of the same manufacturer and the same specifications, using the same mount. In other words, strip A and slide B share the common feature that within a single image group, the position of the image plane in the direction of the optical axis L is substantially constant for all the frames of interest.

Therefore, by performing image reading in such a manner that only the frame to be first read is subjected to focusing whereas the other frames are not subjected to focusing but that the result of the focusing of the first frame is simply adopted, the projecting light can be applied to form an effective image on the image-receiving plane of the image sensor 20 and thereby achieve precise image reading irrespective of the state of curls in the strip A or the manufacturer and specifications of the slide B. What is more, the focusing operation which is a fairly time-consuming job can be accomplished by the present invention in a significantly reduced time (through a markedly reduced number of adjustments) and, hence, image reading can be performed with an extremely high efficiency to ensure the production of output images (prints) in high yield.

In another preferred embodiment, the illustrated input apparatus 10 may select an operational mode in which all frames of interest or only those frames which are selectively specified are subjected to automatic focusing. In this mode, depending on the use of output images (prints), not only the first frame but also other frames may be set for selective performance of automatic focusing.

According to the system described in the foregoing paragraphs, image reading can be accomplished with high efficiency. In practice, however, even the frames of a single image group are variable in the position of image plane along the optical axis L though the difference is extremely small and image reading cannot be performed in a completely focused condition but slight errors are involved. These reading errors are by no means significant in the usual case; however, in the case of image reading with an extremely high precision (such as where a very large output image is to be produced by so-called "high enlargement") or in applications that require output images of extremely high quality (as in the case where the output image is to be used as a printing original), even those reading errors may occasionally cause a problem.

The input apparatus 10 has a basic operational mode in which only the first frame is subjected to focusing and it is adapted to be capable of selecting a special mode in which any other frames may be subjected to focusing depending on the need. In this way, the apparatus can realize highly efficient image reading and yet it can advantageously be applied to uses where the above-described highly precise reading is required.

According to the second embodiment of the invention, the focus adjusting means 104 and the associated parts of the input apparatus 10 basically perform two-step focusing on the first frame (image) of a single image group, which consists of a rough adjustment for searching through a wide area to find the (provisional) focus position and a fine adjustment for finding the best focus position by closely searching through a narrow area that is set on the basis of the (provisional) focus position detected by the coarse adjustment. The other frames of the same image group are subjected to one-step automatic focusing which solely consists of a search for the best focus position that corresponds to the fine adjustment in the two-step focusing.

For example, if the original is slide B, the most frequently encountered case is that a request is made to perform simultaneous image reading on (or prepare prints simultaneously) from a group of slides, such as where a certain customer has requested collective image reading of one slide group. In a case like this, the slide (frame) to be read first is subjected to the two-step automatic focusing and the remaining slides are subjected to image reading after the one-step automatic focusing. If the original is strip A, a similar process is adopted and only the frame that is to be first read among the frames of a single strip A is subjected to the two-step automatic focusing and the remaining frames are subjected to the one-step automatic focusing.

As already mentioned, strip A and slide B generally share the common feature that within a single image group, the position of the image plane in the direction of the optical axis L is substantially constant for all the frames of interest.

Thus, according to the second embodiment of the invention, only the first frame to be read is subjected to the two-step focusing which consists of a search through a wide area to find the (provisional) focus position and determine a narrow area including said focus position, followed by searching through said narrow area to find the correct best focus position whereas the other frames are subjected to the one-step focusing for finding the best focus position by searching through the narrow area which includes the (provisional) focus position determined by the wide-area search in the two-step focusing. In this way, the projecting light can be applied to form the correct focused image on the image-receiving plane of the image sensor 20 and thereby achieves precise image reading irrespective of the state of curls in the strip A or the manufacturer and specifications of the slide B. What is more, the focusing operation which is a fairly time-consuming job can be accomplished by the present invention in a significantly reduced time and, hence, image reading can be performed with an extremely high efficiency to ensure the production of output images (prints) in high yield.

Figure 8:
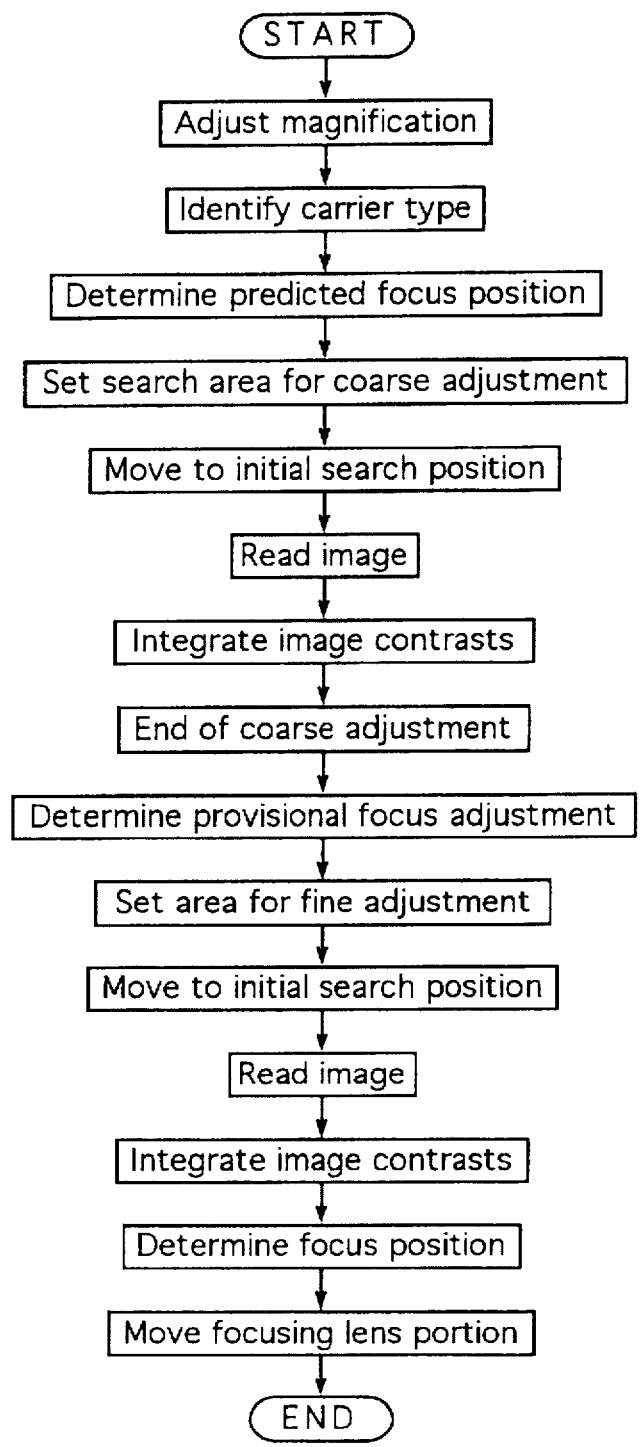
FIG. 8 is a flowchart for illustrating the process sequence of automatic focus adjustment to be performed by the image inputting apparatus of the invention in accordance with its second embodiment.
Figure 9:
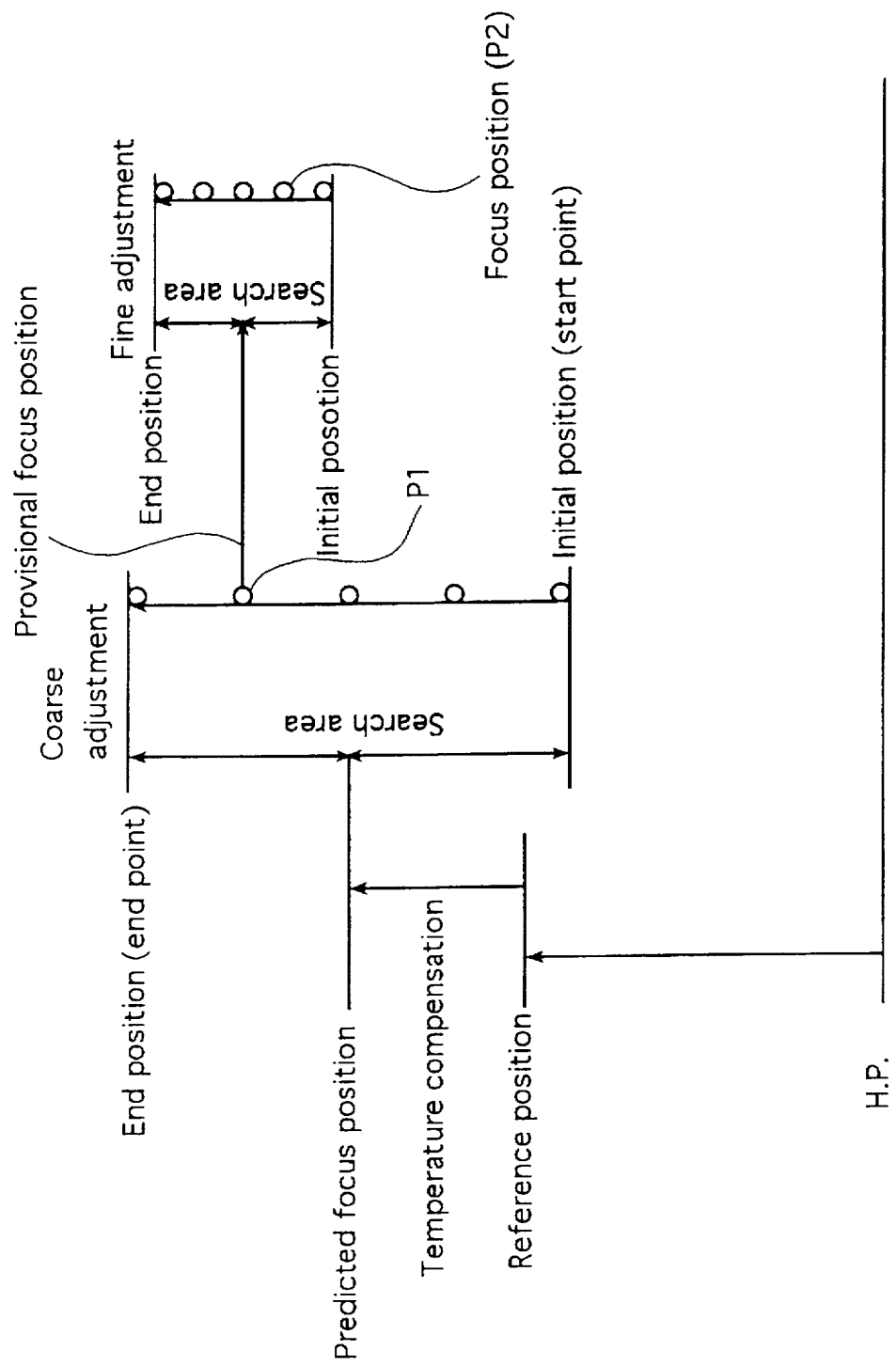
FIG. 9 is a diagram illustrating the concept of automatic focus adjustment to be performed in accordance with the second embodiment of the invention.

Specific procedures for performing automatic focusing with the input apparatus 10 according to the second embodiment of the invention will now be described with reference to the flowchart shown in FIG. 8 and the schematic diagram shown in FIG. 9.

The step of coarse adjustment in the two-step automatic focusing according to the second embodiment is essentially the same as the method of determining the focus position in the one-step focusing according to the first embodiment, except on the breadth of search area and the number of search points (i.e., the precision of searching) and, hence, a detailed description of this step will be omitted.

When the first frame of an image group to be read is transported to the reading position in the input apparatus 10, the zoom lens portion 96 is adjusted for magnification such that the projecting light bearing the image to be read will have a maximum size that can be received by the image sensor 20. As already mentioned, the control section 21 of the input apparatus 10 makes preliminary detection of the type of the original (whether it is strip A or slide B) by identifying the carrier on the carrier base 16 by the carrier identification means 120. Hence, on the basis of the thus obtained type of original and magnification, the focusing means 104 reads a reference position for focusing out of the memory 103 via CPU 102.

The focusing means 104 then performs temperature compensation of the reference position to determine a predicted focus position. As is well known, the focus positions of a zoom lens and a focusing lens vary with temperature. In the illustrated input apparatus 10, a table for correcting the reference position in accordance with the magnification of the zoom lens portion 96 and the temperature of the lens unit 92 is stored in the memory 103, from which the focusing means 104 reads a correction value associated with the temperature of the lens unit 92 as measured with a thermometer (not shown) and the magnification of the zoom lens portion 96. The correction value is added to the previously read reference value to determine the predicted focus position.

The focusing means 104 is instructed by the CPU 102 to read the breadth of search area for coarse adjustment from the memory 103 in accordance with the type of the original to be read. As shown in FIG. 9, the focus adjusting means 104 then sets the search area for coarse adjustment, with the predicted focus position lying in the center.

It should be noted here that the breadth of search area for coarse adjustment is not limited to any particular values and, as already mentioned, it may be set on the basis of empirically determined maximum variations of the image plane for each type of originals to be read. If the original is slide B, the breadth of search area for coarse adjustment may typically range from about 1.5 to about 2.5 mm with respect to the optical axis L.

When the search area is set, the focusing means 104 drives the focusing motor 94 so that the focusing lens portion 98 is adjusted (moved) to a START point, or the initial position where coarse adjustment starts. When the focusing lens portion 98 is adjusted to the initial position, coarse adjustment will start. In the coarse adjustment, reading light is issued from the light source section 14 and at the same time the focusing motor 94 is driven to move the focus of the focusing lens portion 98 toward the END position at a specified rate such that the focal position of the focusing lens portion 98 is continuously varied (the focal length is extended in the case under consideration) from the initial to the end position of the search area while the electronic shutter in the image sensor 20 is released at specified intervals. As a result, the projecting light that has been adjusted in quantity by passage through the G filter 28G inserted into the optical path L and which bears the image (G image) that has passed through the film is read with the image sensor 20 such that the image (G image) on the film is read at a plurality of focal lengths within the search area (at five points in the case shown in FIG. 9).

It should be noted here that the image reading operation to be performed in the second embodiment is in no way limited to the case of reading images while driving the focusing motor 94. Alternatively, the focusing motor 94 may be stopped at each specified image reading point, where the image is read with the focal position being fixed. This method enables correct image reading but, on the other hand, it is time-consuming. A suitable method may be selected in consideration of such factors as the characteristics of the input apparatus and the image performance required.

Output signals from the image sensor 20 are sent to the image processing unit 100, subjected to specified image processing and forwarded to the focusing means 104 as image information. The focusing means 104 calculates integral values of image contrast from the obtained image and determines as a provisional focus position the position where the integral value of image contrast is the highest of all the reading points.

The focusing means 104 then reads out of the memory 103 the breadth of search area for fine adjustment in accordance with the type of original to be read and repeats the procedure of coarse adjustment to determine the search area for fine adjustment, with the provisional focus position lying in the center. If the provisional focus position is indicated by P1 in FIG. 9, this point is used as the center for determining the search area for fine adjustment.

Needless to say, the search area and the search pitch for fine adjustment should be narrower than the search area and the search pitch for coarse adjustment, respectively, and may be determined in accordance with empirically measured values such as a maximum curl in the film. In a typical case, the breadth of the search area for fine adjustment ranges from about 0.5 mm to about 1 mm with respect to the optical axis L. Alternatively, the breadth of the search area for fine adjustment may be defined by the distance between two points of the highest integral value of image contrast that are attained in the step of coarse adjustment.

With the search area being thusly set, fine adjustment is performed in the same manner as in the coarse adjustment. The focusing motor 94 is driven to adjust the focusing lens portion 98 such that it is moved to the initial position for starting the fine adjustment, namely, the point of the shortest focal length within the search area setting for the fine adjustment. When the step of fine adjustment is started at the initial position, reading light is issued from the light source section 14 and at the same time the focusing motor 94 is driven to the END position while the image (G image) on the film is read at a plurality of points of focal lengths within the search area (at five points in the case shown in FIG. 9).

As in the case of coarse adjustment, the image reading operation in the step of fine adjustment is by no means limited to the case of reading images while driving the focusing motor 94. If emphasis is placed on the reading efficiency (productivity), images may be read with the focal length being varied; if precision is more important, the focusing lens portion 98 may be fixed during image reading.

Output signals from the image sensor 20 are sent to the image processing unit 100, subjected to specified image processing and forwarded to the focusing means 104 as image information. The focusing means 104 then calculates integral values of image contrast.

The focusing means 104 also detects a position of the highest integral value of image contrast from among all reading points. If this position is indicated by P2 in FIG. 9, it is determined as the best focus position and the focusing motor 94 is driven to adjust the focusing adjusting lens portion 98 to P2 so that the focus of the projecting light will be in exact registry with the image-receiving plane of the image sensor 20.

The foregoing description of the automatic focusing operation assumes that the initial position for both the coarse and fine adjustments is the point of the shortest focal length within the search area. However, this is not the sole case of the second embodiment of the invention and the initial position may be different in the two steps of adjustment. For example, the initial position for coarse adjustment may have a shorter focal length than the initial position for fine adjustment. As exemplified by this alternative case, the driving of the focusing motor 94 (or the adjustment of the focusing lens portion 98) during the search for focus position may be adapted to be reciprocal so that the focusing operation can be finished within a shorter time. In practice, however, mechanical apparatus usually involve errors in movement due to backlashing. Therefore, if precision is a predominant factor, the driving of the focusing motor 94 is preferably controlled in such a way that both searching for the best focus position and the movement of the focusing lens portion 98 to that focus position are effected in a single predetermined direction.

When the automatic focusing for the first frame ends, prescanning is performed to read the film image roughly and then main scanning is performed to read the image for output. When the image reading of the first frame ends, it is rejected from the reading position Z and the second frame is transported to the same reading position Z, where it is subjected to automatic focusing and image reading.

As already mentioned, the automatic focusing to be performed on the second and subsequent frames in the input apparatus 10 under consideration is a one-step process in which a search for the best focus position is conducted solely by a focusing procedure corresponding to the fine adjustment in the two-step process.

Stated specifically, when the image of the second frame is transported to the reading position Z, the focusing means 104 reads out of the memory 103 the breadth of the search area for one-step focusing of the second and subsequent frames in accordance with the type of the original to be read. The focusing means 104 then sets the search area, with the center lying in the focus position for the image reading of the first frame (P2 in the case described in the preceding paragraphs). Alternatively, the search area may be set in a completely identical manner to the fine adjustment of the two-step focusing process, with the center of the search area coinciding with the provisional focus position obtained by the coarse adjustment of the first frame.

When the search area being thusly set, image reading is performed in the same manner as in the fine adjustment of the two-step focusing process and the position of the highest integral value of image contrast is detected and determined as the best focus position; the focusing motor 94 is then driven so that the focusing lens portion 98 is adjusted to the thus determined focus position. After this focusing operation, prescanning and main scanning are performed.

The breadth of the search area for finding the best focus position for the image reading of the second and subsequent frames may typically be the same as in the case of the step of fine adjustment in the two-step focusing process.

As described above, the input apparatus according to the second embodiment of the invention is adapted to be such that irrespective of whether the original is strip A or slide B, automatic focusing is basically performed by applying the two-step search method to the first frame of the same image group whereas the focus position for the second and subsequent frames is located by the one-step search method. In practice, however, the strip A does not have a mount and, as already mentioned, reading of the image on the strip A is performed as the film is directly depressed onto the bottom of the guide groove 48 by means of the depressing member 60 and, hence, the image plane will not greatly vary from one strip to another.

In addition, taking one strip A, the curl is in most cases substantially constant for all images (all frames), so the variation in the image plane between individual images (frames) in one strip can be reduced to an extremely small level by depressing the strip with the depressing member 60.

In other words, the strip A does not require the focus position to be detected by searching through a wide area as in the step of coarse adjustment in the two-step process and, what is more, the variation in the image plane is very small as long as a single strip is concerned. Under these circumstances, if the original is strip A, automatic focusing for image reading is preferably performed as in the first embodiment, namely, only the first frame to be read is subjected to searching for the focus position by the one-step process and the other frames are not subjected to any focusing but the focus state of the first frame is simply adopted. This method ensures very rapid image reading of the strips which need be read most frequently and thereby improves the reading efficiency so markedly as to realize higher productivity.

Needless to say, the first frame of the strip A may be subjected to automatic focusing by the two-step process whereas no focusing is performed on the other frames.

According to the third embodiment of the present invention, the input apparatus 10 may be adapted to be capable of selecting various focusing modes by a switching means. As regards the selection of frames to be subjected to focusing, the input apparatus may have a mode for performing automatic focusing on all frames of a single image group by either the one-step or two-step process, or a mode in which the frames to be subjected to automatic focusing are selected from a single image group and accordingly set before image reading is started, or a mode in which the frames to be subjected to automatic focusing are appropriately selected and set during the image reading of a single image group, or a mode of performing more than one of these capabilities.

An example of mode selection and the selection of frames to be subjected to focusing is as follows. Display 110 is furnished with an indication of the command for setting the frames to be subjected to focusing. If this command is not actuated, automatic focusing is performed on only the first frame in the manner described hereinabove; if the command is actuated, all the frames to be read are unconditionally subjected to automatic focusing or, alternatively, an instruction is given to perform focusing on designated frames such as by subjecting up to the nth frame (n is an integer) or the nth and subsequent frames to focusing or subjecting only the nth frame to focusing. In this way, the frames to be subjected to focusing are selected and set. If desired, the input apparatus may be so adapted that mode and frame setting can be effected during the reading of a single image group. In this case, the reading of the frames that have not been subjected to focusing may be performed adopting the focus state obtained either in the step immediately before that image reading or for the first frame.

The necessary commands and operations for setting the frames to be subjected to focusing may be entered by manipulation of the keyboard 106 and the mouse 108.

The input apparatus 10 of the invention may be adapted otherwise to have, for example, a "learning capability" by which the apparatus memorizes the focusing operation performed on the preceding frames and performs the next focusing operation by setting the focusing area and other parameters on the basis of the memory, whereby, the time to perform focusing on all or designated frames can be shortened.

The input apparatus 10 may also be adapted in such a way that the state of curl in the strip A loaded on the film carrier 22 is detected by, for example, the image plane detecting sensor 54 and that on the basis of the detected state of curl, automatic selection is made between a mode of performing focusing on the first frame but not on the subsequent frames and a mode of performing focusing on all frames.

Alternatively, the input apparatus 10 may be adapted such that the state of curl is detected prior to image reading, thereby preliminarily determining the required amount of focusing, namely, the amount by which the focusing motor 94 should be driven.

The input apparatus 10 of the invention which has the basic construction described on the foregoing pages may specifically be operated as follows in the first embodiment.

First, depending on whether the original to be read is strip A or slide B, a suitable carrier is mounted on the carrier base 16 as shown in FIGS. 3a, 3b and 3c. If the strip A is the original to be read, the film carrier 22 is mounted in a specified position on the carrier base 16 as shown in FIG. 3a.

In a separate step, the keyboard 106 and the mouse 108 are manipulated to set the print size and perform any other operations. If any frames other than the first one are to be set for automatic focusing, the necessary setting is entered by manipulation of the keyboard 106 and the mouse 108 on the basis of the relevant indication on the display 110.

If it is verified that the quantity of light from the light source section 14 is at a specified level, the compressing member 60 of the film compressing unit 52 is pivoted upward and the strip A is loaded on the film carrier 22 in such a way that the first frame recorded on the strip is located in the reading position Z. A command is then entered to start image reading.

As mentioned a few paragraphs ago, the strip A loaded on the film carrier 22 may be read by the image plane detecting sensor 54 and the necessary data such as the number of recorded frames are sent to the control section 21 and operations such as the setting of the frames that need be subjected to focusing may be performed on the basis of those data. In this case, the first frame is transported automatically to the reading position Z in accordance with the result of reading of the strip A by the image plane detecting sensor 54.

When a command for image reading is delivered, the first frame is subjected to automatic focusing. The G filter 28B in the light source section 14 is inserted into the optical path L and the light whose quantity has been adjusted by the G filter 28G passes through the strip A; the projecting light bearing the G image has its quantity adjusted by the lens unit 92, read by the image sensor 20 and sent to the control section 21, where it is subjected to specified image processing and thence forwarded to the focusing means 104. As described hereinabove, the reading of G image is performed at a plurality of focal lengths within a specified search area and the focusing means 104 determines the required amount of focusing from the image contrasts of the obtained G images. On the basis of this data, the focusing means 104 drives the focusing motor 94 to adjust the focusing lens portion 98.

Prescanning then starts. In the light source section 14, the G filter 28G was inserted into the optical path L in the step of focusing operation. Hence, the light whose quantity has been adjusted by the G filter 28G continues to pass through the strip A and the projecting light bearing the G image is processed by the lens unit 92 to form a focused image on the image sensor 20; the G image of the original is thus read and sent to the control section 21. When the reading of the G image ends, the color filter plate 28 rotates and another filter, say, R filter 28R is inserted into the optical path L and the R image is read in a similar way. Further, B image is similarly read to complete the prescanning step.

In the control section 21, the images obtained by prescanning are shown on the display 110 and, depending on the need, the setting of the principal recorded object and other operations are performed. In the image processing unit 100, the necessary reading conditions (e.g., the amount by which the quantity of light is reduced by the diaphragm stop 26 in the light source section 14) and image processing conditions are determined in accordance with the entered image information, the setting of the principal object, etc.

If the necessary reading and image processing conditions are determined and when the required focusing and other adjustments such as for the diaphragm stop 26 end, main scanning will start. As in the prescanning step, the G filter 28G is inserted into the optical path L and the light whose quantity has been adjusted by the G filter 28G passes through the strip A and the projecting light is processed by the lens unit 92 to form a focused image on the image sensor 20; the G image of the original is read and then sent to the control section 21. In subsequent steps, the R and B images are read in a similar manner and sent to the control section 21.

The image processing unit 100 in the control section 21 performs specified processing such as A/D conversion on the output signals from the image sensor 20 and outputs them to the image recording unit P as image information for outputting. If the strip A is a reversal film, positive image information is converted to negative image information in the image processing unit 100 and thence delivered to the recording device P.

When the image reading of the first frame thusly ends, a signal to that effect is delivered from the control section 21 to the film carrier 22, whereupon the compressing member 60 pivots upward to disengage the strip A. Subsequently, the transport means 50 is activated to transport the strip A in the direction of arrow x until it stops in accordance with the result of reading with the image plane detecting sensor 54. Thereafter, the next frame is transported to the reading position Z.

Subsequently, the compressing member 60 pivots downward to fix the strip A such that prescanning and main scanning are successively performed to read the image of the next frame. If no setting has been made to perform automatic focusing on this frame (or all frames of strip A), no focusing is effected before prescanning and not only prescanning but also main scanning is performed with the focusing lens portion 98 maintaining the state of focusing effected on the first frame. If the second frame is such that setting for automatic focusing has been made, it is subjected to prescanning and main scanning after automatic focusing is performed as on the first frame.

While the image inputting apparatus of the present invention has been described above in detail, the invention is by no means limited to the case described hereinabove and it goes without saying that various design modifications and improvements can be made without departing from the spirit and scope of the invention.

As described in detail on the foregoing pages, the image inputting apparatus of the invention ensures that the projecting light bearing the images recorded on strips and slides can be precisely focused on image sensors such as a CCD sensor and the resulting images can be read with sufficiently high efficiency to achieve a significant improvement in the efficiency of the production of output images.

What is claimed is:

1. An image inputting apparatus for reading an image recorded on a transmission original, which comprises:
   a light source for illuminating the transmission original with reading light;
   an image sensor for photoelectrically reading the reading light that has issued from said light source and which has been transmitted through the transmission original;

an imaging lens for permitting said transmitted light to be focused on said image sensor;

focusing means for automatically adjusting a focus of said imaging lens; and control means for controlling said focusing means before starting the reading of a new image group such that only a first frame of said image group is subjected to automatic focusing whereas the other frames of the same image group are not subjected to focusing but image reading is performed adopting a focus state of said first frame.

2. An image inputting apparatus according to claim 1, which further includes setting means for setting a frame or frames which, in addition to the first frame of the image group, are to be subjected to automatic focusing.

3. An image inputting apparatus for reading an image recorded on a transmission original, which comprises:

a light source for illuminating the transmission original with reading light;

an image sensor for photoelectrically reading the reading light that has issued from said light source and which has been transmitted through the transmission original;

an imaging lens for permitting said transmitted light to be focused on said image sensor;

focusing means for automatically adjusting a focus of said imaging lens; and control means for controlling said focusing means before starting the reading of a new image group such that only a first frame of said image group is subjected to automatic focusing consisting of coarse adjustment combined with fine adjustment whereas the other frames of the same image group are subjected to automatic focusing comprising only fine adjustment.

4. An image inputting apparatus according to claim 3, which further includes setting means for setting a frame or frames which, in addition to the first frame of the image group, are subjected to automatic focusing consisting of coarse adjustment and fine adjustment and/or a frame or frames which are not subjected to automatic focusing.

5. An image inputting apparatus for reading an image recorded on a transmission original, which comprises:

a light source for illuminating the transmission original with reading light;

an image sensor for photoelectrically reading the reading light that has issued from said light source and which has been transmitted through the transmission original;

an imaging lens for permitting said transmitted light to be focused on said image sensor;

focusing means for automatically adjusting a focus of said imaging lens;

selection means for setting an automatic focusing mode independently for both a first frame of a new image group and the other frames of the same image group; and control means for controlling said focusing means such as to perform automatic focusing in the automatic focusing mode selected by said selection means.

6. An image inputting apparatus according to claim 5, which further includes detection means for detecting a type of said transmission original and automatic focusing mode switching means for switching one automatic focusing mode to another for the frames other than the first of the image group in accordance with a result of detection by said detection means.

7. An image inputting apparatus according to claim 5, wherein the automatic focusing mode is either a mode for performing automatic focusing consisting of coarse adjustment combined with fine adjustment, or a mode for performing automatic focusing comprising only fine adjustment, or a review mode for checking an amount of fine adjustment and in which, if said amount exceeds a specified level, both coarse and fine adjustments are performed, or a mode in which, upon reading of a specified number of frames, either automatic focusing consisting of coarse adjustment combined with fine adjustment or automatic focusing comprising only fine adjustment is performed.

\* \* \* \* \*